United States Patent [19]

Dunning et al.

[11] 3,951,573

[45] Apr. 20, 1976

[54] FLUID LUBRICATED BEARING CONSTRUCTION

[75] Inventors: John R. Dunning, Riverdale, N.Y.; Henry A. Boorse, Leonia, N.J.; Gilbert F. Boeker, New York, N.Y.

[73] Assignee: The United States of America as represented by the United States Energy Research and Development Administration, Washington, D.C.

[22] Filed: July 16, 1946

[21] Appl. No.: 683,872

[52] U.S. Cl. .................................. 417/424; 308/9; 308/160; 308/DIG. 1; 415/104
[51] Int. Cl.² ........................................ F04B 17/00
[58] Field of Search ........... 103/87; 230/117; 308/9, 308/160, 168, 170, 172, DIG. 1; 417/423, 424; 415/104

[56] References Cited
UNITED STATES PATENTS

| | | | |
|---|---|---|---|
| 1,845,789 | 2/1932 | Gilson | 308/168 |
| 1,898,659 | 3/1933 | Gardner | 308/172 |
| 1,974,183 | 9/1934 | Gunderson | 103/87 |
| 1,974,678 | 9/1934 | Lafont | 103/87 |
| 2,531,098 | 11/1950 | Anderson | 230/117 |

*Primary Examiner*—Samuel W. Engle
*Assistant Examiner*—H. Tudor
*Attorney, Agent, or Firm*—Dean E. Carlson; Leonard Belkin

EXEMPLARY CLAIM

1. A fluid lubricated thrust bearing assembly comprising, in combination, a first bearing member having a plain bearing surface, a second bearing member having a bearing surface confronting the bearing surface of said first bearing member and provided with at least one spiral groove extending inwardly from the periphery of said second bearing member, one of said bearing members having an axial fluid-tight well, a source of fluid lubricant adjacent to the periphery of said second bearing member, and means for relatively rotating said bearing members to cause said lubricant to be drawn through said groove and to flow between said bearing surfaces, whereby a sufficient pressure is built up between said bearing surfaces and in said well to tend to separate said bearing surfaces.

13 Claims, 5 Drawing Figures

INVENTORS
JOHN R. DUNNING
HENRY A. BOORSE
GILBERT F. BOEKER

FLUID LUBRICATED BEARING CONSTRUCTION

This invention relates to thrust bearings and more particularly, to a novel type of fluid lubricated thrust bearing and housing construction wherein the thrust bearing acts as a pump to increase the lubricant pressure between the bearing surfaces and within the housing, thereby improving the lubrication of the thrust bearing and of other bearing surfaces within the housing. The housing of the present invention may be employed with particular advantage where the nature of the load on the thrust bearing is such that the use of a gaseous lubricant to lubricate the bearings within the housing is either desirable or mandatory. However, as the description proceeds, it will be apparent that the bearing and housing can also be used with other types of fluid lubricants such as oil or water.

As conducive to a clearer understanding of the present invention, it may be pointed out that conventional oil lubricated bearings are subject to a number of disadvantages and limitations that militate against their use in certain special situations. Thus, for example, in a pump or compressor to be used in handling corrosive gases, the corrosive gas may be of such a character that it reacts chemically with the oil and destroys its lubricating properties. Furthermore, the gas may become contaminated either with the oil lubricant or its vapors or with the products of the reaction between the corrosive gas and the lubricant. The use of seals to prevent intermingling of the corrosive gas and oil is frequently unsatisfactory because of the difficulty of maintaining seals gas-tight in the presence of a corrosive gas. On the other hand, if the bearing is so constructed that it may be used with a gaseous lubricant, the gas being handled can itself be used as a lubricant, thus eliminating the necessity for addition of lubricant from an outside source and making it possible to hermetically seal the pump or compressor with respect to the surrounding atmosphere. It is thus apparent that gas-lubricated bearings possess a substantial advantage when used in equipment for handling highly corrosive gases.

For the same or similar reasons gas lubrication may be used with advantage in other situations such as where the gas being pumped, although non-corrosive, must be maintained free from contamination with foreign materials or in cases where it is desirable to preclude the possibility of leakage of the gas being pumped such as where the gas is poisonous or otherwise objectionable or unusually valuable.

Other advantages of using a gaseous lubricant arise out of the fact that the viscosities of gases are, in general, substantially less than the viscosities of liquids and increase with increasing temperatures. Since the viscosity of a gas is usually less than that of a liquid lubricant such as oil, frictional effects can be substantially reduced by substituting gas-lubricated bearings for oil-lubricated bearings and a corresponding reduction in the power input required to overcome such frictional effects can be achieved. Furthermore, the increase in viscosity with increasing temperature that is characteristic of gases constitutes a safety factor in the operation of gas-lubricated bearings. In the case of an oil-lubricated bearing, an increase in the temperature of the bearing increases the probability that the bearing will fail, whereas with a gas-lubricated bearing the reverse is true. For this reason, among others, it is the usual practice to design a gas-lubricated bearing with a smaller factor of safety than would be required in the case of an oil-lubricated bearing.

In spite of these advantages of the gas-lubricated bearing, such bearings have not been used to any appreciable extent commercially because the bearings previously used could support only relatively light loads. The present invention provides a thrust bearing construction that may be lubricated entirely by a gas to attain the advantages described above and is capable of supporting substantially greater loads than heretofore possible, especially at relatively low absolute pressures.

It is an object of the present invention to provide improved means for supporting and driving a rotating element.

It is another object of the invention to provide an improved bearing that may be lubricated entirely by a gaseous lubricant.

It is a further object of the invention to provide a fluid lubricated thrust bearing that may be advantageously embodied in a pump or blower for the handling of corrosive gases.

It is a still further object of the invention to provide a fluid lubricated thrust bearing wherein a fluid pressure is built up between two bearing surfaces and the pressure thus built up is used to provide additional support for a rotating element.

It is another object of the invention to provide a thrust bearing and sealed casing construction wherein the lubricant pressure built up between the thrust bearing surfaces is used to lubricate other bearing surfaces within the casing.

Still another object of the invention is to provide an improved gas-lubricated bearing that is capable of supporting loads greater than heretofore possible, especially at relatively low gas lubricant pressures.

Other objects of the invention will be in part obvious and in part pointed out hereinafter.

The many objects and advantages of the present invention may be best appreciated by referring to the accompanying drawings which illustrate an electrically driven motor blower unit incorporating a preferred embodiment and a modification of the present invention and wherein.

Figure 1:
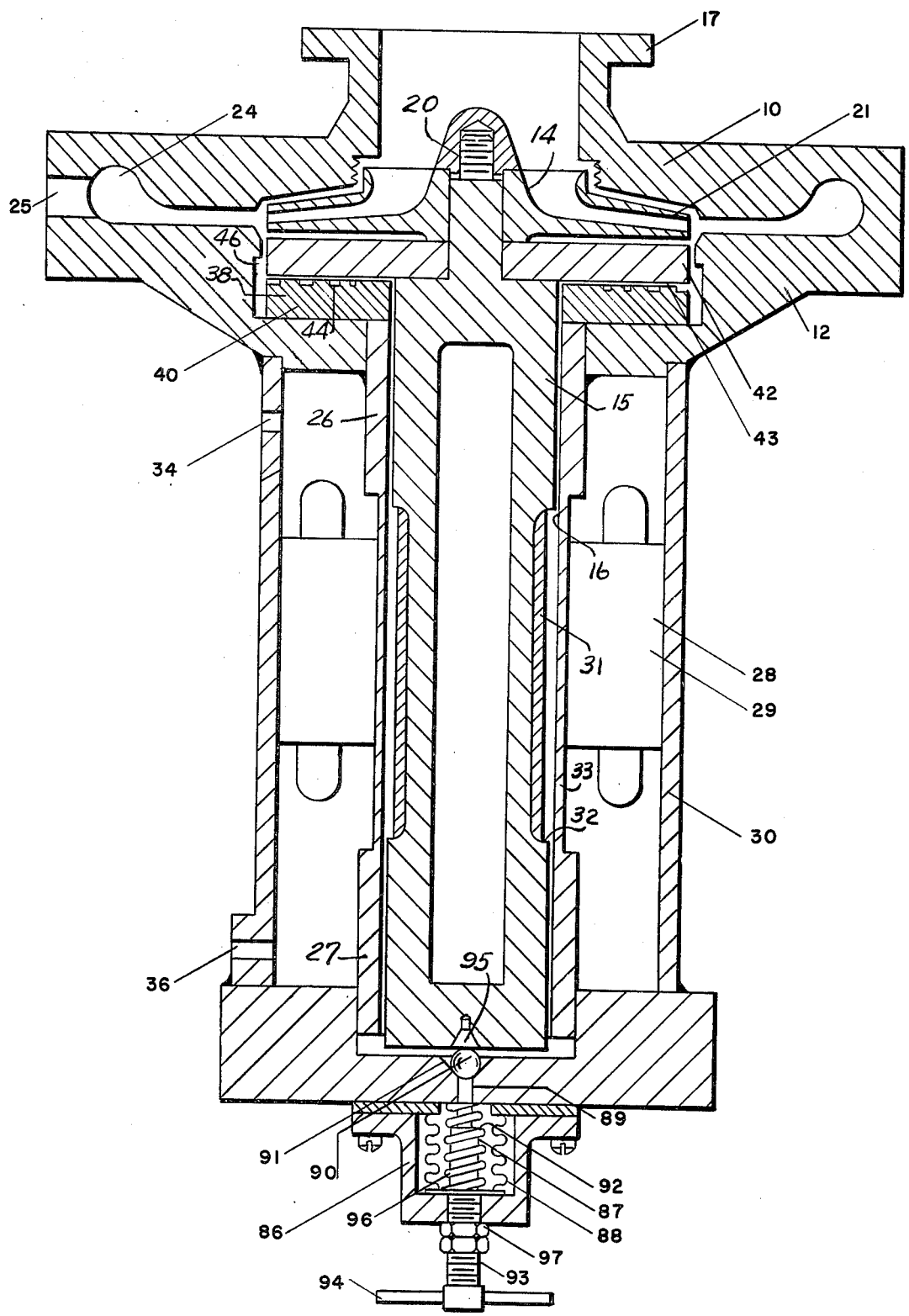
FIG. 1 is a vertical section of the blower or centrifugal compressor showing the arrangement of the rotor and bearings within the casing.

Referring to the drawings and particularly to FIG. 1, the numeral 10 designates a centrifugal compressor comprising a sealed gas-tight casing 12 and a rotor 14 that rotates about a vertical axis.

The rotor 14 comprises a hollow vertical shaft 15 located in a cavity or well 16 of the casing 12; a thrust collar 42 that forms part of a thrust bearing 38 and has an annular bearing surface 43 on its underside; and an impeller 20 mounted on the shaft 15 and located in the upper part of the casing. The term, thrust bearing, as used in the present specification and claims comprehends both the stationary and movable portions of the bearing. The gas to be compressed is drawn into the casing through a flanged inlet 17 and flows through impeller vane 21 to a discharge passage 24, and then leaves the casing through conduit 25. The rotating impeller 20 cooperates with the passage 24 to compress and pump the gas flowing therethrough.

The rotor 14 receives its principal vertical support from the gas-lubricated thrust bearing 38 and is laterally guided by the journal or guide bearings 26 and 27 near the top and bottom, respectively, of the shaft portion 15 of the rotor.

In the lower part of housing 12 an electric motor 28, preferably an induction motor, is provided for driving the rotor 14. The motor comprises a stator 29 having the customary field windings and located in an annular compartment 30 of the housing and a cylindrical armature 31 mounted in a cut-out portion 32 of the shaft 15. Two openings 34 and 36 are provided in compartment 30 to permit circulation of a cooling fluid therethrough to cool the field windings of the motor. A thin wall or diaphragm 33 is provided between the armature 31 and stator 29 to seal the interior of the housing and prevent the gas being pumped from coming in contact with the field windings of the stator. The diaphragm 33 may be made of any metal preferably having a high electrical resistance such as Monel or nichrome metal, or may be made of a suitably attached non-conductor. In cases where the gas being pumped is non-corrosive and there is thus no need to protect the stator or windings from the gas being pumped, it will usually be desirable to omit the diaphragm 33. Where, on the other hand, the gas being pumped is corrosive, the diaphragm prevents the gas from coming in contact with the stator, and the armature as well as other parts of the rotor may be made of a corrosion resistant material so that there will be no danger of damage to the motor or other parts of the unit due to the corrosive action of the gas.

As pointed out above, the rotor 14 and impeller 20 are supported on a thrust bearing 38 comprising the thrust collar 42, that is secured to, and rotates with the rotor shaft 15 and has a plane horizontal bearing surface 43, and an annular thrust plate 40 that is fixed to the casing 12.

Figure 2:
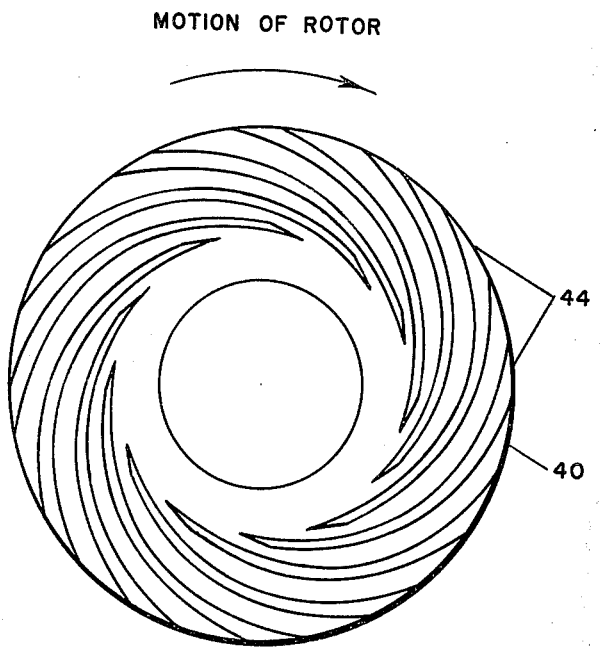
FIG. 2 is a top plan view taken on the line 2—2 of FIG. 1 showing an arrangement of the spiral grooves on the surface of the thrust plate.

The construction of the thrust plate 40 is best shown in FIG. 2 of the drawings. Referring to FIG. 2, the surface of the thrust plate is provided with a plurality of spiral grooves 44, each of which opens at the outer periphery of the thrust plate and curves inwardly in the direction of rotation of the rotor 14 to a point approximately three-fourths of the way from the outer to the inner periphery of the thrust plate. The grooves are preferably made relatively shallow and may be of the order of 0.0015 to 0.005 inch deep. As shown in FIG. 1, the depth of the grooves is exaggerated.

In order to reduce the starting torque when the compressor is placed into operation, means are provided near the bottom of the casing 12 for temporarily supporting the rotor 14 during the starting period. Referring again to FIG. 1, there is provided at the bottom of the casing 12 a housing 86 containing a plunger 87 which is encased in a flexible metal bellows 88 sealed to the casing 12. The plunger 87 has an extension 89 of reduced diameter that passes through the casing 12 into contact with a ball bearing 90 which normally rests in a conical recess 91 in the interior of casing 12. The shoulder 92 of plunger 87 limits upward movement of the plunger.

The bellows 88 is provided with a relatively stiff internal spring 96 which tends to keep the bellows distended. The bellows may be compressed and the plunger 87 moved upwardly by rotation of a screw 93 which is threaded into the bottom of housing 86 and is provided with a handle 94. The construction is such that the screw 93 may be rotated to move the plunger 87 upwardly and force ball bearing 90 against a conical bearing surface 95 at the bottom of rotor 14. In this way the rotor may be lifted and the starting torque on motor 28 reduced.

When the rotor has attained a sufficient speed to cause the gas pressure in thrust bearing 38 to build up to the point at which the load can be carried by the thrust bearing, the plunger 87 is lowered and thereafter the weight of the rotor 14 is carried by the thrust bearing 38. The lock nuts 97 are provided to maintain the screw 93 and plunger 87 in fixed position except when the plunger is being raised or lowered.

The operation of the above described apparatus is as follows: The arrow in FIG. 2 indicates the direction of rotation of the rotor 14 and thrust collar 42. As the compressor is placed in operation, the rotation of the thrust collar 42 with respect to the thrust plate 40 causes a portion of the gas being pumped to be drawn from passage 24 down through a conduit 46 and into the grooves 44 in thrust plate 40. When the gas reaches the end of each groove 44, it flows between the bearing surfaces of thrust plate 40 and thrust collar 42 and escapes at the inner and outer edges of the thrust plate 40, thus providing a pneumatic cushion between these bearing surfaces that supports the rotor and associated parts. The result is that a gas pressure is built up that is a maximum at the inner ends of the grooves 44 and decreases to substantially the pump discharge pressure at the outer periphery of the bearing surfaces.

Gas that reaches the inner periphery of the thrust plate 40 flows into the well 16 of the casing 12 to increase the gas pressure in the well. The thrust bearing 38 acts as a pump for this purpose. The resulting increased gas pressure within the well 16 performs several different functions that produce improved operation of the apparatus as a whole. In the first place, this pressure within the well tends to lift the rotor 14 and provide additional support therefor, since the bottom of shaft 15 and well 16 in effect form a supplementary thrust bearing which assists the bearing 38 in supporting the rotor 14. Secondly, the increased pressure between the shaft 15 and casing wall 33 produces an increase in the bulk modulus of elasticity of the gas, thereby improving the lubrication of journal bearings 26 and 27. Thirdly, the higher gas pressure in the well increases heat transfer from the shaft 15 to the casing wall 33 and therefore facilitates the cooling by convection of parts of the motor that may become overheated.

When the compressor reaches its normal operating speed, an equilibrium condition is attained such that no further gas flows into the well 16. From this time on, gas is drawn into the grooves 44 of plate 40 and then flows outwardly between the bearing surfaces of collar 42 and thrust plate 40 and escapes at the outer periphery of the bearing. As pointed out above, there is a pressure gradient between the inner end of grooves 44 and the outer periphery of the bearing surfaces. Under equilibrium conditions the pressure on the inner portion of the bearing surfaces and within the well is approximately the maximum pressure developed, and hence the total force tending to separate the bearing surfaces is greater than it would be if no enclosure were provided and the gas could escape at the inner edge of the bearing surfaces.

The structure of FIG. 2 is a representation of a thrust plate that gave satisfactory results when tested. This thrust plate had an overall diameter of 8½ inches and a central opening 3½ inches in diameter. It was provided with twelve spiral grooves having a depth of approximately 0.0025 inch, an inlet width of 7/32 inch and a length of 6 inches. The grooves extended in from the periphery of the thrust plate approximately three-fourths of the way to the inner rim of the plate.

Figure 4:
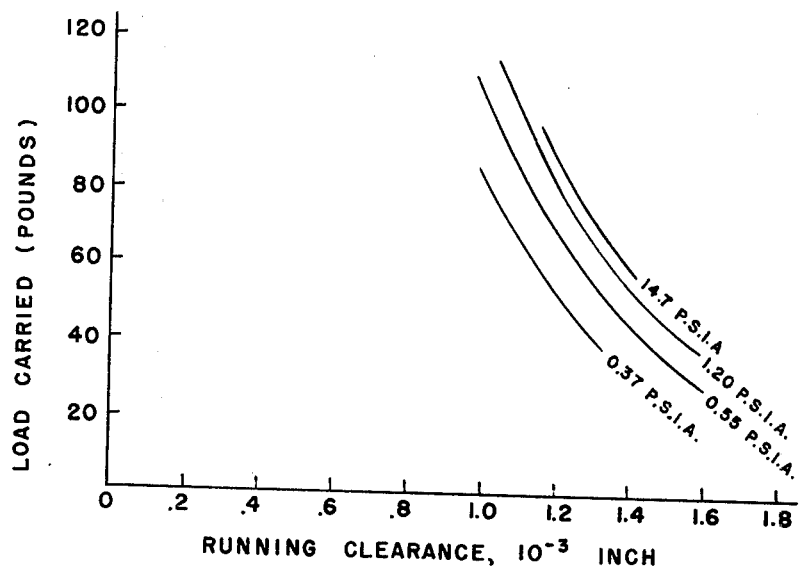
FIGS. 4 and 5 are curves showing the operating characteristics of the thrust bearing of FIG. 1.
Figure 5:
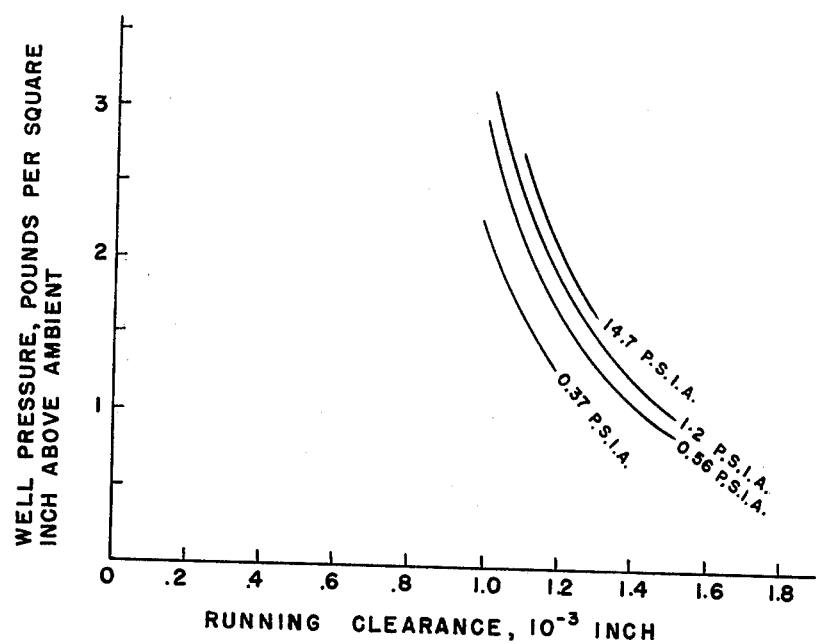

The operating characteristics of this bearing when lubricated with atmospheric air are indicated in FIGS. 4 and 5. FIG. 4 shows the relationship between load and running clearance at a speed of 6150 R.P.M. and for four different ambient pressures, the pressures being given in pounds per square inch absolute. The curves show that the bearing is capable of carrying substantial loads at running clearances of more than 0.001 inch, and that the bearing operates in a surprisingly effective manner at relatively low ambient pressures.

FIG. 5 shows the relationship between the pressure increase in the well and the running clearance at a speed of 6150 R.P.M. and for four absolute ambient pressures. These curves show that a substantial increase in pressure is obtained within the well and that the pressure increase within the well is particularly significant at relatively low ambient pressures.

The depth, width, and number of the grooves 44 varies with such factors as the size of the bearing, the load it is to carry, the running clearance, and the speed of rotation. In general, if a larger number of grooves is provided or the grooves are made wider, the load-carrying capacity of the bearing will be increased for a given rotational speed and running clearance and vice versa, provided, of course, that the total groove area is not made so large as to result in excessive radial leakage from the grooves. Tapering the grooves, as in FIG. 2, while not essential, permits the insertion of a larger number of grooves when the bearing is to be used at low ambient pressures, thus improving the load-carrying capacity of the bearing. In the structure shown in FIG. 2 the grooves extend nearly to the inner rim of the annular bearing surface but it is obvious that the point at which the grooves terminate may be varied to obtain the desired operating characteristics.

The curvature of the grooves may likewise be varied within relatively wide limits. The inclination of a groove at any point may be defined in terms of the angle formed by a line tangent to the groove at that point and a line tangent to a circle passing through that point and having its center coincident with the center of the bearing. For the case where the grooved surface is the fixed bearing member, the angle of inclination of the groove is the angle between the positive directions of the two tangents just described, the tangent to the groove being drawn in the direction from the entrance to the terminus of the groove, and the tangent to the circle being drawn in the direction of rotation of the rotor of the bearing. For the case where the groove surface is on the rotor of the bearing the angle of inclination of the groove is defined as before but the tangent to the circle is drawn in the direction counter to the direction of rotation of the rotor of the bearing. The angle of inclination of the groove should be an acute angle and in most cases will preferably be kept less than 30° for each point on the groove.

It is usually desirable that the depth of the grooves be such as to give a maximum flow of gaseous lubricant across the bearing surfaces. If the grooves are made too deep, movement of the bearing surface 43 with respect to thrust plate 40 will not operate to draw a sufficient quantity of gaseous lubricant through the grooves. If, on the other hand, the grooves are made too shallow, the cross-sectional area of the groove is so small that an insufficient quantity of gas flows therethrough. It has been found that a satisfactory flow of lubricant may be obtained by using grooves having a depth of the order of 0.0015 to 0.005 inch.

Two factors that affect the choice of a groove depth within the stated range of 0.0015 to 0.005 inch are planeness tolerance and compressibility effect. It is evident that for a given number of grooves of given width the groove depth should be so chosen as to provide a sufficient running clearance or lubricant film thickness to prevent the bearing surfaces from touching. Ordinarily it will be desirable to provide a film thickness several times as great as the planeness tolerance of the bearing surfaces. The precise film thickness or running clearance to be provided is largely a matter of engineering choice but may be of the order of one mil or greater. It is further desirable that the groove depth be sufficiently greater than 0.0015 inch to decrease the compressibility effect of the gaseous lubricant, especially where low ambient pressures are used.

The bearing surfaces may be made of any suitable materials, a preferred material of construction being stainless steel. In general it is desirable that both bearing surfaces be made of hard materials although in some cases the conventional practice of making one bearing surface of a softer metal than the other may be adopted.

Figure 3:
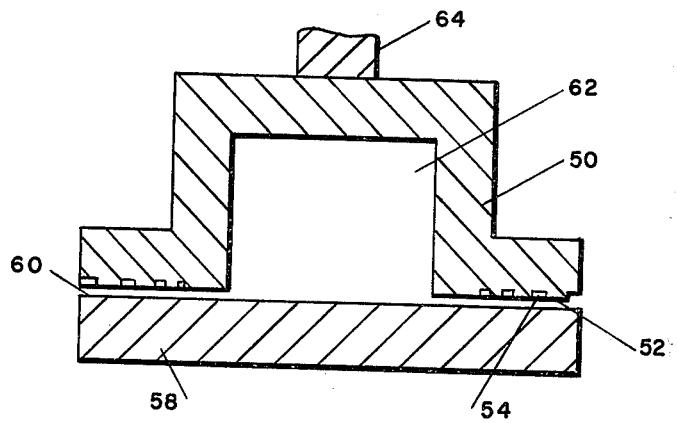
FIG. 3 is a fragmentary vertical section showing somewhat diagrammatically an alternative construction of the thrust bearing of the present invention.

Referring now to FIG. 3 of the drawings, there is shown in this figure a modification of the bearing of FIG. 1. The rotatable bearing member 50 supports a shaft 64 and has a horizontal bearing surface 52 provided with spiral grooves 54 that may be similar to those shown in FIG. 2. The bearing member 50 is provided with a recess or well 62. The thrust plate 58 has a bearing surface 60 confronting the bearing surface 52 of the bearing member 50. The well 62 in bearing member 50 is similar to the well 16 and performs a similar function. Rotation of the bearing member 50 causes a lubricant gas, for example, atmospheric air, to be drawn through grooves 54 and between bearing surfaces 52 and 60. Air pressure is thus built up between the bearing surfaces and in the well 62 to support the bearing member 50 and associated parts as previously described.

From the above description it is apparent that the present invention provides a bearing construction that may be used with a gaseous lubricant to attain numerous objectives that cannot be attained where a liquid or solid lubricant is used. Although the bearing of the present invention is particularly well suited for use in equipment handling corrosive gases, it may be advantageously used with non-corrosive gases as well. As previously pointed out, the relatively low viscosity of gases as compared with liquid or solid lubricants reduces friction in the bearing and hence reduces the power required to drive a rotating element supported by the bearing. This factor is of importance in the case of equipment designed to operate at unusually high speeds. The bearing of the present invention may be used with particular advantage in centrifuges, centrifugal compressors, high speed drills, and other types of apparatus that desirably operate with high rotational speeds.

In addition to the special cases mentioned above, there is a wide variety of general applications where the bearing of the present invention may be employed with advantage because of the saving in power requirements that result from the use of a gaseous lubricant. It should be noted, however, that although the present construction may be used with particular advantage with gaseous lubricants, its use is not limited to such lubricants.

It is, of course, to be understood that the invention is not limited to the specific construction shown in the drawings. Thus, the number, size, and location of the grooves 44 and 54 may be varied to suit desired operating conditions as pointed out above. Furthermore the shape of the grooves may be varied, i.e., the grooves may be straight or curved in other ways than spirally. Although the present bearing has been illustrated as incorporated in a vertically arranged motor blower unit, it is evident that the bearing is capable of supporting the axial thrust of a shaft carrying other types of loads and rotatable about an axis other than a vertical axis. In FIG. 1 the surface 43 is shown as a plane surface but it is evident that other types of plain or non-recessed surfaces such as spherical or conical surfaces might be used. In such cases, the bearing surface of the thrust plate would be so shaped that it confronts and conforms generally with the bearing surface of the thrust collar. Other variations within the scope of the invention will be apparent to those skilled in the art.

The starting torque may be reduced in other ways than by the mechanism described above. Thus, a pneumatic lift may be used, that is, a gas from an outside source may be pumped into the bottom of the well 16 to lift the rotor until it has come up to speed.

In the embodiments shown in the drawings the stationary portion of the thrust bearing is recessed. However, it is evident that the surface of the rotatable member may be recessed or, if desired, both of the surfaces may be recessed. Other variations within the scope of the invention will be apparent to those skilled in the art.

Since many embodiments might be made of the present invention and since many changes might be made in the preferred embodiment described above, it is to be understood that the foregoing description is to be interpreted as illustrative only and not in a limiting sense, except as required by the appended claims.

We claim:

1. A fluid lubricated thrust bearing assembly comprising, in combination, a first bearing member having a plain bearing surface, a second bearing member having a bearing surface confronting the bearing surface of said first bearing member and provided with at least one spiral groove extending inwardly from the periphery of said second bearing member, one of said bearing members having an axial fluid-tight well, a source of fluid lubricant adjacent to the periphery of said second bearing member, and means for relatively rotating said bearing members to cause said lubricant to be drawn through said groove and to flow between said bearing surfaces, whereby a sufficient pressure is built up between said bearing surfaces and in said well to tend to separate said bearing surfaces.

2. A fluid lubricated thrust bearing assembly comprising, in combination, a rotatable bearing member having a plane bearing surface, a thrust plate having a bearing surface confronting the bearing surface of said rotatable member and provided with at least one groove extending inwardly from the periphery of said second bearing member, said thrust plate having an axial fluid-tight well and said rotatable member having a shaft portion extending into said well, a source of fluid lubricant adjacent to the periphery of said second bearing member, and means for rotating said rotatable member to cause said lubricant to be drawn into said groove and to flow between said bearing surfaces, whereby a sufficient pressure is built up between said bearing surfaces and in said well to support said rotatable member.

3. A fluid lubricated thrust bearing assembly comprising, in combination, a rotatable bearing member having a plane bearing surface, a thrust plate having a bearing surface confronting said plane bearing surface and provided with a plurality of grooves extending from the outer periphery of said thrust plate and curving inwardly in the direction of rotation of said rotatable member, said thrust plate having an axial fluid-tight well and said rotatable member having a shaft extending into said well, a source of fluid lubricant adjacent the outer edge of said thrust plate, and means for rotating said rotatable member to cause said lubricant to be drawn into said grooves, whereby a sufficient pressure is built up between said bearing surfaces and in said well to lubricate said surfaces and support said rotatable member.

4. A fluid lubricated thrust bearing assembly comprising, in combination, a rotatable bearing member having a plane bearing surface, a thrust plate having an annular bearing surface confronting the bearing surface of said rotatable member and provided with a plurality of grooves curving inwardly from the outer periphery of said thrust plate, said grooves terminating about half way across said annular bearing surface, said thrust plate having a central fluid-tight well and said rotatable member having a shaft extending downwardly into said well, a source of fluid lubricant adjacent the outer edge of said thrust plate, and means for rotating said rotatable member to cause said lubricant to be drawn into said grooves, whereby a sufficient pressure is built up between said bearing surfaces and in said well to lubricate said bearing surfaces and support said rotatable member.

5. A fluid lubricated thrust bearing assembly comprising, in combination, a rotatable bearing member having a plane bearing surface, a thrust plate having a bearing surface confronting the bearing surface of said rotatable member and provided with a plurality of curved grooves extending inwardly from the periphery of said thrust plate, said thrust plate having a central fluid-tight well and said rotatable member having a shaft extending into said well, a pair of journal bearings within said well for supporting said shaft therein, a source of fluid lubricant adjacent the outer edges of said bearing surfaces, and means for rotating said rotatable member to cause said lubricant to be drawn into said grooves, whereby a sufficient pressure is built up between said bearing surfaces and within said journal bearings to lubricate said bearings and support said rotatable member.

6. In apparatus for supporting and driving a rotating element such as a pump impeller, in combination, a rotatable bearing member integral with said rotating element and having a plane bearing surface, a thrust member having a bearing surface confronting the bearing surface of said rotatable member and provided with a plurality of grooves extending inwardly from the periphery of said bearing surface, said thrust member having a gas-tight axial well, a shaft integral with said rotatable member and said rotating element and extending into said gas-tight well, a source of fluid lubricant adjacent the outer edges of said bearing surfaces, and an electric motor for driving said shaft, rotatable member, and rotating element to cause said lubricant to be drawn into said grooves and to flow between said bearing surfaces and into said well, said motor comprising an armature mounted on said shaft within said well and a cooperating stator located outside said gas-tight well.

7. In a motor-driven, gas-lubricated centrifugal compressor, in combination, a sealed gas-tight casing having an axial gas-tight well formed therein and having an annular thrust plate secured in gas-tight relation to said well near the open end thereof, said thrust plate having a bearing surface provided with a plurality of spiral grooves, a rotor including an impeller, a shaft extending into said well and a bearing surface confronting the bearing surface of said thrust plate, a source of gaseous lubricant adjacent the outer periphery of said bearing surfaces, and motor means for rotating said rotor, whereby said gaseous lubricant is drawn into said grooves and between said bearing surfaces to lubricate said surfaces and increase the pressure in said well.

8. In a motor-driven, gas-lubricated centrifugal compressor, in combination, a sealed gas-tight casing having an axial gas-tight well formed therein and having an annular thrust plate secured in gas-tight relation to said well near the open end thereof, said thrust plate having a bearing surface provided with a plurality of spiral grooves, a rotor including an impeller, a shaft extending into said well and a bearing surface confronting the bearing surface of said thrust plate, a source of gaseous lubricant adjacent the outer periphery of said bearing surfaces, a pair of spaced journal bearings within said well for supporting the radial load of said rotor therein, and motor means for rotating said rotor to cause said gaseous lubricant to be drawn into said grooves and to flow between said thrust bearing surfaces, whereby a sufficient pressure is built up between said thrust bearing surfaces and in said well to lubricate said journal bearings and support said rotor.

9. In a motor-driven, gas-lubricated centrifugal compressor, in combination, a sealed gas-tight casing having an axial gas-tight well formed therein and having an annular thrust plate secured in gas-tight relation to the upper periphery of said well, said thrust plate having a bearing surface provided with a plurality of spiral grooves, a rotor including an impeller, a vertical shaft extending into said well, and a bearing surface confronting the bearing surface of said thrust plate, a source of gaseous lubricant adjacent the outer periphery of said bearing surfaces, and an electric motor for driving said rotor in said casing to cause said gaseous lubricant to be drawn into said spiral grooves and between said horizontal bearing surfaces, whereby a sufficient pressure is built up between said bearing surfaces and in said well to lubricate said surfaces and support said rotor, said electric motor comprising an armature mounted on said shaft within said well and a cooperating stator located outside said gas-tight well.

10. In a motor-driven, gas-lubricated centrifugal compressor, in combination, a sealed gas-tight casing having an axial gas-tight well formed therein and an annular compartment surrounding said well, said casing having an annular horizontal thrust plate secured in gas-tight relation to the upper periphery of said well, said thrust plate having a bearing surface provided with a plurality of grooves extending inwardly from the periphery of said bearing surface, a rotor including an impeller, a vertical shaft extending into said well and a bearing surface confronting the bearing surface of said thrust plate, a source of gaseous lubricant adjacent the outer periphery of said bearing surfaces, and motor means for rotating said rotor comprising an armature mounted on said shaft within said well and a cooperating stator located in said annular compartment.

11. A gas lubricated thrust bearing comprising a bearing member rotatable about an axis and having an annular plane bearing surface, a thrust plate member having an annular plane bearing surface confronting the bearing surface of said rotatable member, means defining an enclosed fluid-tight space communicating with a common margin of said annular bearing surfaces, and means for rotating said rotatable bearing member, one of said members having a plurality of grooves formed in its annular bearing surface and extending from a margin thereof toward the margin in communication with the enclosed space, said grooves being constructed and arranged such that a line tangent to any of said grooves at any point defines an acute angle with a line tangent at the same point to a circle drawn about the axis of rotation, whereby a gaseous medium is drawn between said surfaces and builds up a pressure in said enclosed space in response to the rotation of the rotatable bearing member.

12. A gas lubricated thrust bearing comprising a bearing member rotatable about an axis and having an annular plane bearing surface, a thrust plate member having an annular plane bearing surface confronting the bearing surface of said rotatable member, means defining an enclosed fluid-tight space communicating with a common margin of said annular bearing surfaces, and means for rotating said rotatable bearing member, one of said members having a plurality of grooves formed in its annular bearing surface and extending from a margin thereof toward the margin in communication with the enclosed space, the depth of each groove being from 2 to 5 mils, said grooves being constructed and arranged such that a line tangent to any of said grooves at any point defines an acute angle with a line tangent at the same point to a circle drawn about the axis of rotation, whereby a gaseous medium is drawn between said surfaces and builds up a pressure in said enclosed space in response to the rotation of the rotatable bearing member.

13. In combination, an apparatus having a gas-tight housing and a rotor-member therein, a gas-lubricated guide-bearing for journaling said rotor-member, and a gas-lubricated thrust-bearing for transmitting the thrust from the rotor-member to the housing, said thrust-bearing comprising two opposed bearing-members having opposed annular thrust-carrying surfaces lying between an inner circle and an outer circle, one of said bearing members being a runner carried by the rotor-member, the other bearing-member being a bearing-plate carried by the housing member, at least one of said bearing-members having a grooved bearing-surface with a plurality of grooves extending from one of said circles substantially all the way to the other at an angle with respect to the tangent to the circle of rotation of the bearing at each point along the length of each groove, said angle not exceeding about 30° for any material part of any of the grooves, the groove-depth being sufficiently over 1.5 mils and the number and width of the grooves being sufficiently large so that the film-thickness is several times the planeness-tolerances of the opposed bearing-surfaces, the groove-depth being under 5 mils so as to increase the sustainable bearing load, said thrust-bearing substantially dividing the space within said housing into a low-pressure space immediately adjacent to the gas-entrance side of the thrust-bearing and a high-pressure space on the other side of the thrust-bearing, and the guide-bearing being disposed on the high-pressure side of the thrust bearing.

* * * * *